(No Model.)
E. L. STANFIELD.
END GATE FOR WAGONS.
No. 488,584. Patented Dec. 27, 1892.
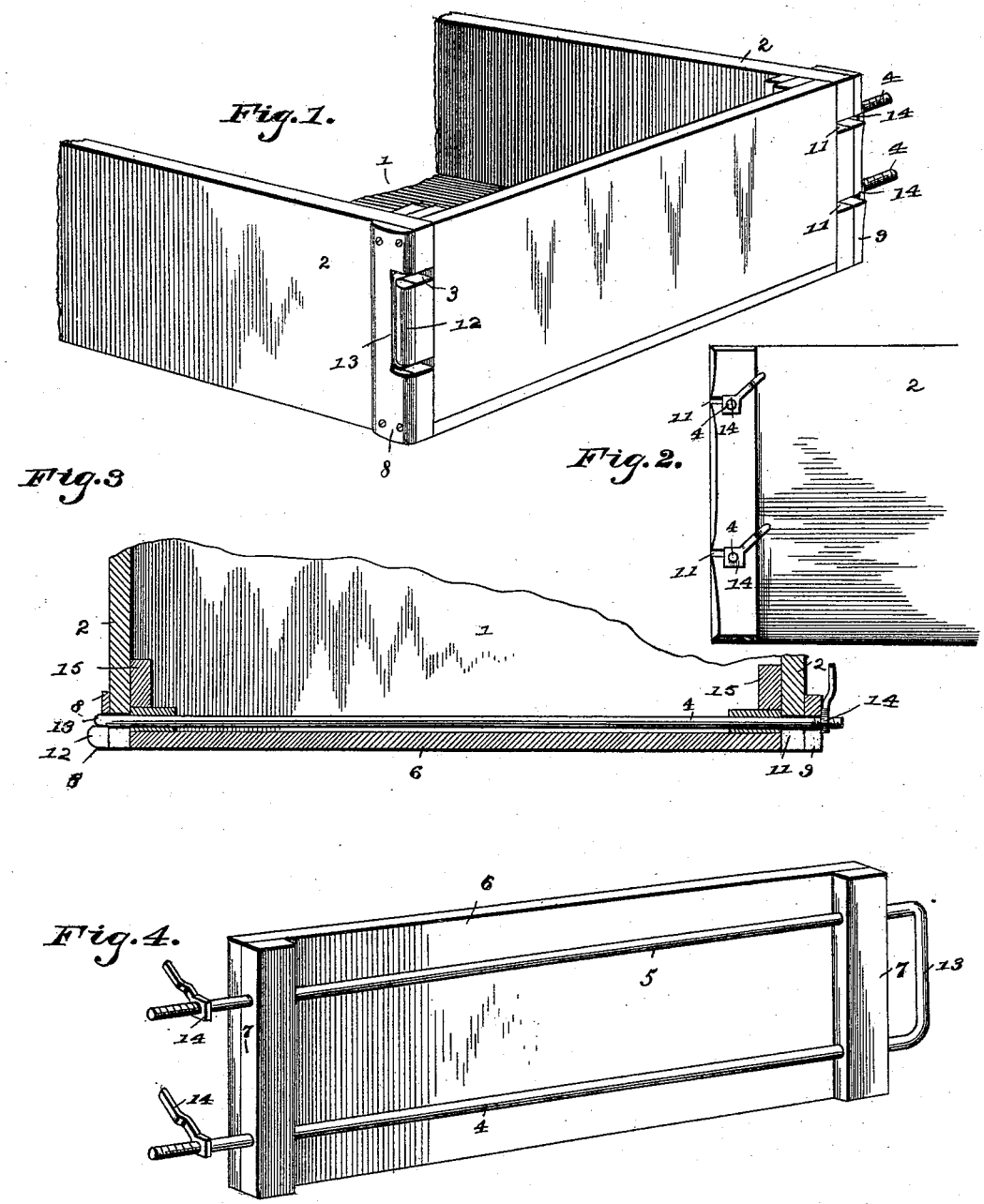
Witnesses
Inventor
Edwin L. Stanfield.
By his Attorneys,

UNITED STATES PATENT OFFICE.

EDWIN L. STANFIELD, OF BELDEN, NEBRASKA.

END-GATE FOR WAGONS.

SPECIFICATION forming part of Letters Patent No. 488,584, dated December 27, 1892.

Application filed August 11, 1892. Serial No. 442,751. (No model.)

*To all whom it may concern:*

Be it known that I, EDWIN L. STANFIELD, a citizen of the United States, residing at Belden, in the county of Cedar and State of Nebraska, have invented a new and useful End-Gate, of which the following is a specification.

The invention relates to improvements in end gates.

The object of the present invention is to improve the construction of the means for securing end gates to wagon bodies, and to enable the same to be securely fastened in place, and to be readily removed for dumping in comparatively little space so that a vehicle may be fully backed to the place where a load is to be deposited.

The invention consists in the construction and novel combination and arrangement of parts hereinafter fully described, illustrated in the accompanying drawings and pointed out in the claims hereto appended.

In the drawings—Figure 1 is a perspective view of an end gate constructed in accordance with this invention. Fig. 2 is a side elevation of the same. Fig. 3 is a horizontal sectional view. Fig. 4 is a detail perspective view of the end gate detached.

Like numerals of reference indicate corresponding parts in all the figures of the drawings.

1 designates a wagon body provided in the rear edges of its sides 2 with recesses 3 to receive the side rod 4 of a rectangular securing frame 5 which is attached to and carried by an end gate 6, whereby when the end gate is removed the securing frame does not have to be withdrawn from the end gate, but is simply disengaged from the recesses 3. The end gate is provided on its inner face with vertical cleats 7 which are provided with openings or perforations in which are arranged the side bars or rods of the rectangular securing frame.

The sides of the wagon body are provided on their outer faces with metal cleats 8 and 9 which are provided with recesses 10 and 11, which register with the recesses 3, and the metal cleats serve to increase the strength of the body. The cleat 8 is provided between its recesses with a longitudinal flange 12, which is engaged by the cross-piece 13 of the rectangular securing frame, whereby the end gate is locked. The recesses 11 of the cleat 9 terminate in rounded portions to receive the ends of the side rods of the securing frame; and the said ends are threaded and are engaged by nuts 14 which are provided with handles to enable them to be readily turned to draw the cross-piece of the securing frame into engagement with the flange of the cleat 8. The inner faces of the sides of the body are provided with vertical cleats 15.

When it is desired to remove the end gate, the nuts on the threaded ends of the side rods are loosened sufficiently to allow the frame to be moved longitudinally to disengage the cross-piece from the flange, after which the end gate may be readily removed without turning, and without necessitating the space required by a hinged end gate, thereby enabling a vehicle to be backed close to the place where a load is to be dumped. The end gate is readily replaced by placing the ends of the side rods in the recesses and drawing the cross-piece of the frame in engagement with the flange of the cleat.

What I claim is—

1. The combination with a body provided in its sides with upper and lower recesses, an end gate, a securing frame approximately U-shaped carried by the end gate and projecting from the ends thereof and having its parallel sides arranged in said recesses and its connecting piece engaging one side of the body, the opposite ends of the sides of the frame being threaded, and nuts arranged on the threaded ends of the frame and engaging the body, substantially as described.

2. The combination of a body provided with recesses, the metal cleats secured to the outer faces of the sides of the body and provided with recesses registering with those of the body, one of the cleats being provided with a longitudinal flange, an end gate, a rectangular securing frame carried by the end gate and comprising horizontal side rods fitting in the recesses and a cross-piece connecting the rods at one end of the frame and adapted to engage the flange, and means for securing the ends of the rods at the other ends of the frame, substantially as described.

In testimony that I claim the foregoing as my own I have hereto affixed my signature in the presence of two witnesses.

EDWIN L. STANFIELD.

Witnesses:
C. C. FREEBURN,
F. M. KIMBALL.